No. 807,420. PATENTED DEC. 12, 1905.
A. W. COPLAND.
DOUGH CUTTER.
APPLICATION FILED JAN. 26, 1904.

3 SHEETS—SHEET 1.

WITNESSES
INVENTOR
ALEXANDER W. COPLAND
BY James Whittemore
ATT'Y.

No. 807,420. PATENTED DEC. 12, 1905.
A. W. COPLAND.
DOUGH CUTTER.
APPLICATION FILED JAN. 26, 1904.

3 SHEETS—SHEET 2.

WITNESSES
INVENTOR
ALEXANDER·W·COPLAND·
BY
ATT'Y.

No. 807,420. PATENTED DEC. 12, 1905.
A. W. COPLAND.
DOUGH CUTTER.
APPLICATION FILED JAN. 26, 1904.

3 SHEETS—SHEET 3.

WITNESSES
INVENTOR
ALEXANDER W. COPLAND
BY James Whittemore
ATT'Y.

UNITED STATES PATENT OFFICE.

ALEXANDER W. COPLAND, OF DETROIT, MICHIGAN.

DOUGH-CUTTER.

No. 807,420.  Specification of Letters Patent.  Patented Dec. 12, 1905.

Application filed January 26, 1904. Serial No. 190,722.

*To all whom it may concern:*

Be it known that I, ALEXANDER W. COPLAND, a citizen of the United States, residing at Detroit, in the county of Wayne and State of Michigan, have invented certain new and useful Improvements in Dough-Cutters, of which the following is a specification, reference being had therein to the accompanying drawings.

The invention relates to rotary dough-cutters, and has for its object the obtaining of a construction provided with improved means for effectively disengaging and removing the cut dough from the cutter.

The invention consists, primarily, in the means employed for uniformly loosening the portions of a cut-dough section from the cutter; further, in the construction whereby the loosened dough-section is prevented from again reëngaging with the cutter; further, in the means for stripping the loosened section from the cutter, and, further, in the peculiar construction, arrangement, and combination of parts, as hereinafter set forth.

Figure 1:
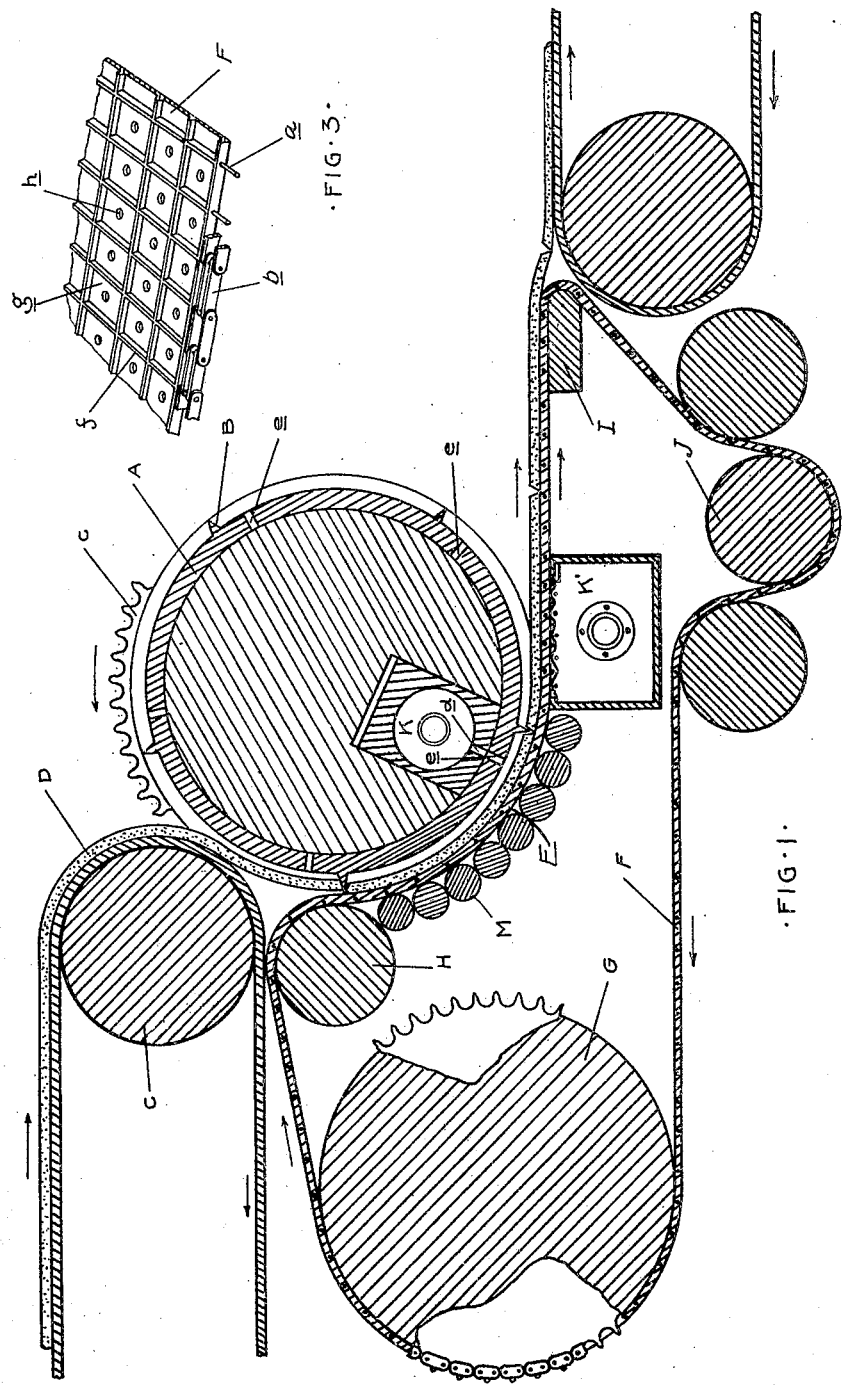
Figure 2:
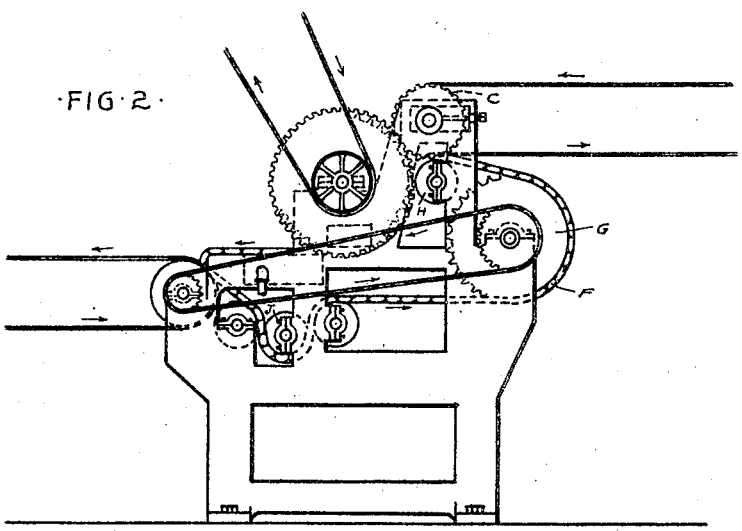
Figure 4:
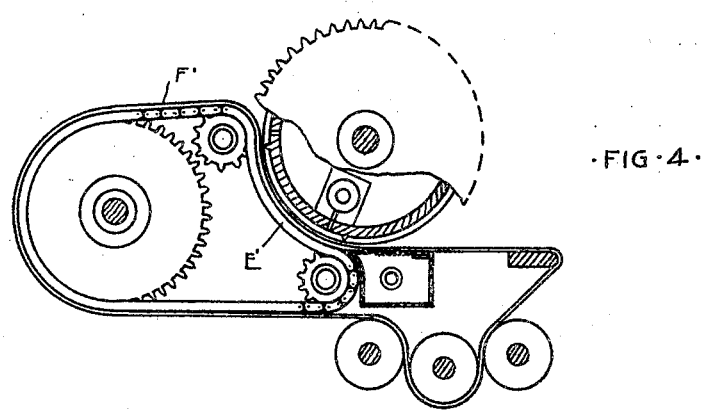
Figure 5:
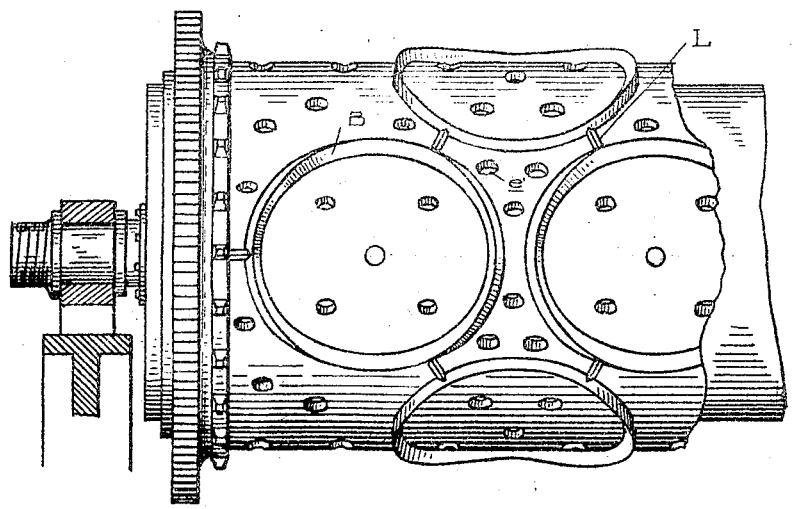
Figure 6:
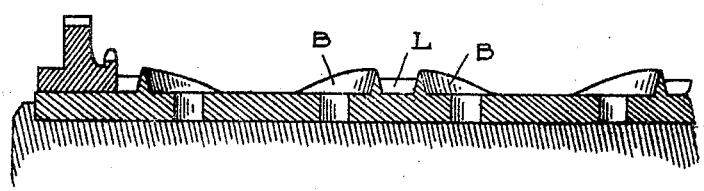

In the drawings, Figure 1 is a vertical longitudinal section through a rotary dough-cutter of my improved construction. Fig. 2 is an elevation thereof. Fig. 3 is a perspective view of a portion of the stripping-apron. Fig. 4 is a view similar to Fig. 1, illustrating a modified construction. Fig. 5 is an elevation of a portion of the cutter, and Fig. 6 is a section thereof.

A is a rotary cutter having arranged on the periphery thereof a series of sharpened ribs B, which outline the cutting-spaces.

C is a compression-roll adjacent to the cutter A, between which and said cutter the sheet-dough (indicated by D) is fed and is severed by the ribs B.

E is a shield arranged around the segment of the cylinder adjacent to the roll C. This shield, as shown in Fig. 1, is formed by an endless apron F, which is fed around said segment and is preferably of the following construction: The apron is formed of suitable flexible material which is strengthened and rendered comparatively rigid laterally by a series of cross-bars *a*. These, as shown, are embedded in the material from which the apron is formed; but they may be arranged in any suitable manner to provide the requisite bracing. The ends of the strengthening-bar *a* are shown as connected with a sprocket-chain *b*, which latter is driven, preferably, by sprockets *c*, arranged at opposite ends of the cutting-cylinder. This construction not only serves to drive the apron at proper speed, but also maintains it uniformly spaced from the cutter. As shown in Fig. 1, the apron F passes around an idler G and thence over the idler H adjacent to the upper end of the segmental portion forming the shield. At the lower end of the segment the apron passes tangentially and preferably in horizontal plane to the thin-edged bearing I, around which it passes and is returned to the idler G. Proper tension is maintained on the apron by means of suitable tightener-rolls, such as indicated at J.

The arrangement of the shield E in relation to the cutter is such that there is a space between the shield and cutter. This space is not much greater and is preferably less than the thickness of the dough-section and is provided for a purpose that will be hereinafter set forth.

The cutter A is provided with means for initially loosening the cut-dough sections during their travel around the segmental shield. As shown, this comprises an air-conduit K, extending longitudinally through the cutter and having a port *d* therein which is adapted to register with a series of ports *e*, formed in the shell of the cutter. These ports *e* communicate with the spaces intermediate the cutting-ribs B. Thus when a dough-section is in engagement with the cutter in one of said spaces and the port *e* is registered with the port *d* in the air-conduit compressed air is admitted into the space, which will move the dough-section outward until further movement is arrested by the shield. As has been stated, the arrangement of the shield in relation to the cutter is preferably such that the space between the cutter and the shield is less than the thickness of the dough. This arrangement will prevent any part of the section being blown out so far from its position in the cutter as to give an opening large enough to make the retention of an effective air-pressure within the cutting-space impossible, the air-pressure within the cutting-space being sufficient that all parts of the dough-section will be moved outwardly against the shield.

With the construction as thus far described it will be understood that the dough fed between the cutter and the compression-roll C is severed into sections, which are then carried around between the cutter and the shield E. During this part of their travel the compressed air is admitted, as before described, with the result that the cut sections are blown outward against the shield and to a greater or less extent freed from the cutter. In the further movement of the cylinder and apron the latter will travel in its horizontal path, while the former continues it rotation, thereby causing the separation of the cut-dough sections from the cutter. To prevent the possibility of the dough being carried around the cylinder through any adhesion between the dough and cutters, means may be provided for positively holding the dough to the apron at the point of separation. This consists of a suction-conduit K′, extending across beneath the apron and open at the top. The opening is arranged at about the point where the apron begins to travel away from the cutter, and the apron is of such a character as to permit of the passage of air therethrough, thereby communicating the suction to the under face of the dough-sections. This will result in causing said sections to adhere to the apron and to completely separate it from the cutter. To facilitate the operation of the suction upon the cut dough, the apron F is preferably formed with ribs $f$ on its upper face, which divide it into a series of small pockets $g$. Each of these pockets has communicating therewith a restricted aperture $h$, passing through the apron, and these apertures during the travel of the apron will be successively registered with the opening in the suction-conduit K′. The effect of this construction is to provide a large effective suction area which is operated from a relatively small port. Thus when through any cause a portion of the apron is not covered by the dough the air passing through the uncovered ports will not be sufficient to destroy the vacuum.

Where the ribs outlining the cutting-spaces do not directly join, I preferably provide cutting-ribs L, which divide the area intermediate the cutting-spaces into a series of separate compartments. The object of this construction is to provide means for moving the "scrap," as well as the cut sections of dough, outward against the retaining-shield by compressed air. This cannot be satisfactorily accomplished if the intermediate area were not divided in separate compartments, for the reason that the air would escape through the scrap-channels. These ribs L are preferably of lesser height than the cutting-ribs B, so that they do not completely sever the scrap-dough, but leave a connected web of scrap which is necessary for the subsequent separation from the cut sections. The function of the ribs is to merely confine the air operating upon a portion thereof. Each of the compartments inclosed by the ribs L is provided with a port $e'$, which is adapted to register with the port $d$ in the conduit K.

In Fig. 4 I have illustrated a modified construction in which the shield is formed by a traveling roller-belt E′, which is separate from the apron F′, on which the dough is fed. With this construction the shield E′ is actuated to form a segment surrounding a portion of the cutter, and the apron F′ is provided with sufficient slack to conform to the shape of the segment.

Where the construction shown in Fig. 1 is used, it may be found desirable to furnish additional support for the segmental portion of the apron which forms the shield—as, for instance, by a series of rolls M arranged around the segment beneath the apron. The essential feature of both these constructions and, in fact, of any construction which may be employed is that the shield is so spaced from the cutter as to avoid pressing the dough into contact with the cutter after it has been loosened by compressed air.

What I claim as my invention is—

1. The combination with a rotary cutter having cutting-ribs to outline the articles to be cut, of means for removing the cut dough from the cutter comprising a moving surface traveling substantially parallel with a segment of the cutter said surface being held slightly away from the cutter, and means moving the cut articles bodily against said surface.

2. The combination with a rotary cutter having cutting-ribs to outline the articles to be cut, of means for removing the cut dough from the cutter, comprising a moving surface traveling substantially parallel with a segment of the cutter said surface being held slightly away from the cutter, and pneumatic means for moving the cut articles bodily against said surface.

3. In a rotary cutter, the combination with ribs outlining cutting-spaces, of means for admitting air under pressure into said spaces at a point in the rotation of said cutter to partially remove the cut dough bodily therefrom, means for limiting the outward movement of the dough in the cutting-spaces when the air is thus admitted, such means retaining the dough in its partially-expelled position to distribute the air in the cutting-space, and means for subsequently stripping the cut dough thus loosened.

4. In a rotary cutter, the combination of ribs outlining spaces, of pneumatic means in said spaces for moving out the cut dough bodily and a stop permitting the slight bodily movement of the dough.

5. In a rotary cutter, the combination of ribs outlining spaces, of means for moving out the cut dough bodily in said spaces sufficiently to loosen the cut dough, and means for subsequently stripping the dough and removing it from the cutter.

6. The combination of a rotary cutter, ribs on the surface outlining cutting-spaces, of a belt surrounding a segment of said cutter, means for holding the belt at such segment in close proximity to but free from the cutter, and means for moving the dough in the cutting-spaces against the belt at such segment.

7. The combination of a rotary cutter, ribs on the surface outlining cutting-spaces, of a belt surrounding a segment of said cutter, and wheels on the cutter over which said belt runs at the edges, for holding the said belt in close proximity to but free from the surface of said cutter.

8. The combination of a rotary cutter having ribs outlining spaces, of a belt guided to pass around a segment of said cutter, in proximity to but held free therefrom, and then extending tangentially from said cutter, of means for forcing the cut dough against said belt.

9. The combination with a rotary cutter of an endless traveling surface guided to pass around a segment of said cutter, but separated therefrom, and then extending tangentially from said cutter, and means for loosening the dough and moving it against said surface, and for applying suction to the tangential surface to complete the stripping.

10. In a cutter the combination with a plurality of severing-ribs outlining separated cutting-spaces, of non-severing ribs connecting said severing-ribs and dividing the area intermediate said cutting-spaces into separate compartments, and air-supply ports leading to the spaces between the cutters.

In testimony whereof I affix my signature in presence of two witnesses.

ALEXANDER W. COPLAND.

Witnesses:
H. C. SMITH,
JAS. P. BARRY.